United States Patent
Tabata et al.

(10) Patent No.: US 6,855,090 B2
(45) Date of Patent: Feb. 15, 2005

(54) INTEGRATED VEHICLE ENGINE/TRANSMISSION CONTROL APPARATUS

(75) Inventors: Atsushi Tabata, Okazaki (JP); Shuji Nagano, Toyota (JP); Makoto Ogiso, Mishima (JP); Masato Kaigawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/209,561

(22) Filed: Aug. 1, 2002

(65) Prior Publication Data

US 2003/0036458 A1 Feb. 20, 2003

(30) Foreign Application Priority Data

Aug. 17, 2001 (JP) .......................... 2001-248221

(51) Int. Cl.⁷ .................... F16H 61/58; B60K 41/04; B60K 41/02; G06F 19/00; G06F 17/00
(52) U.S. Cl. .................... 477/107; 477/62; 477/181; 701/54; 701/67
(58) Field of Search .................... 477/107, 54, 83, 477/90, 62, 168, 181; 701/54, 67

(56) References Cited

U.S. PATENT DOCUMENTS

| | | | |
|---|---|---|---|
| 5,086,889 A | * | 2/1992 | Nobumoto et al. ............ 477/62 |
| 5,515,272 A | * | 5/1996 | Sakai et al. .................... 701/29 |
| 5,626,536 A | * | 5/1997 | Kono et al. ................... 477/181 |
| 5,669,849 A | * | 9/1997 | Tabata et al. ................. 477/102 |
| 5,983,154 A | * | 11/1999 | Morisawa ..................... 701/56 |
| 6,449,550 B1 | * | 9/2002 | Lutz et al. ..................... 701/67 |
| 2003/0109357 A1 | * | 6/2003 | Tabata ......................... 477/109 |

FOREIGN PATENT DOCUMENTS

| | | |
|---|---|---|
| JP | 4-334734 | 11/1992 |
| JP | 5-77660 | 3/1993 |
| JP | 7-145745 | 6/1995 |
| JP | 9-184438 | 7/1997 |
| JP | 9-295527 | 11/1997 |
| JP | 9-308009 | 11/1997 |
| JP | 11-117778 | 4/1999 |
| JP | 11-141364 | 5/1999 |
| JP | 2000-8931 | 1/2000 |

* cited by examiner

Primary Examiner—Tisha Lewis
(74) Attorney, Agent, or Firm—Oblon, Spivak, McClelland, Maier & Neustadt, P.C.

(57) ABSTRACT

An integrated vehicle engine/transmission control apparatus for an automotive vehicle having an engine capable of changing an operating speed thereof by itself, and an automatic transmission operatively connected to the engine and including a lock-up clutch, the apparatus including a lock-up clutch control device operable to control an engaging force of the lock-up clutch, during a shifting action of the transmission, for reducing a shifting shock of said automatic transmission, and a engine speed control device operable to control the engine so as to reduce its operating speed, during the shifting action of the transmission, such that reduction of the engine speed is initiated after a moment of initiation of reduction of the engaging force of the lock-up clutch by the lock-up clutch control means.

30 Claims, 10 Drawing Sheets

FIG. 2

| | C0 | C1 | C2 | B0 | B1 | B2 | B3 | B4 | F0 | F1 | F2 |
|---|---|---|---|---|---|---|---|---|---|---|---|
| P | ○ | | | | | | | | ○ | | |
| R | ◎ | | ○ | ○ | | | | ○ | | | |
| N | ○ | | | | | | | | ○ | | |
| 1st | ○ | ○ | | | | | | ◎ | ○ | | ○ |
| 2nd | ◎ | ○ | | | ◎ | ○ | | | ○ | | |
| 3rd | ○ | ○ | | | | | ○ | | ○ | ○ | |
| 4th | ○ | ○ | ○ | | | △ | | | ○ | | |
| 5th | | ○ | ○ | ○ | | △ | | | | | |

○ ENGAGED  ◎ ENGAGED FOR ENGINE BRAKE APPLICATION  △ ENGAGED (NOT CONTRIBUTING TO TRANSMISSION OF POWER)

FIG. 9A

|  |  | 1-2 SHIFT SLN | 2-3 SHIFT SLN |  | 2-3 SHIFT SLU |
|---|---|---|---|---|---|
| THROTTLE OPENING ANGLE | $\theta_1$ | A1 | B1 |  | X1 |
|  | $\theta_2$ | A2 | B2 |  | X2 |
|  | ⋮ | ⋮ | ⋮ |  | ⋮ |
|  | $\theta_8$ | A8 | B8 |  | X8 |

FIG. 9B

|  |  | 1-2 SHIFT SLN | 2-3 SHIFT SLN |  | 2-3 SHIFT SLU |
|---|---|---|---|---|---|
| THROTTLE OPENING ANGLE | $\theta_1$ | a1 | b1 |  | x1 |
|  | $\theta_2$ | a2 | b2 |  | x2 |
|  | ⋮ | ⋮ | ⋮ |  | ⋮ |
|  | $\theta_8$ | a8 | b8 |  | x8 |

INTEGRATED VEHICLE ENGINE/TRANSMISSION CONTROL APPARATUS

This application is based on Japanese Patent Application No. 2001-248221 filed on Aug. 17, 2001, the contents of which are incorporated hereinto by reference.

BACKGROUND OF THE INVENTION

1. Field of the Invention

The present invention relates to an integrated vehicle engine/transmission control apparatus adapted to control an automotive vehicle provided with an engine whose operating speed is variable, and an automatic transmission arranged to receive an output of the engine.

2. Discussion of Related Art

For controlling an automotive vehicle provided with an automatic transmission arranged to receive an output of an engine, there is proposed a control apparatus to control operations of hydraulically operated frictional coupling devices used in an automatic transmission to effect shifting actions of the automatic transmission, while reducing the operating speed of the engine.

For instance, such a vehicle control apparatus is arranged to positively reduce the operating speed of the engine by establishing slipping or partially engaged states of hydraulically frictional coupling devices such as clutches and brakes in the process of a shift-up action of the automatic transmission. In this case, the vehicle suffers from a shifting shock of the automatic transmission due to an increase of the inertia of the engine as a result of a decrease of the engine speed.

SUMMARY OF THE INVENTION

The present invention was made in the light of the background art discussed above. It is therefore an object of the present invention to provide an integrated vehicle engine/transmission control apparatus, which is arranged to effectively reduce the shifting shock of the automatic transmission due to an increase of the inertia of the engine as a result of positive reduction of the operating speed of the engine.

The object indicated above may be achieved according to a first aspect of this invention, which provides an integrated vehicle engine/transmission control apparatus for an automotive vehicle having an engine capable of changing an operating speed thereof by itself, and an automatic transmission operatively connected to the engine and including a lock-up clutch, the apparatus comprising: (a) lock-up clutch control means for controlling an engaging force of said lock-up clutch, to reduce a shifting shock of the automatic transmission upon a shifting action of the automatic transmission; and (b) engine speed control means for controlling the engine so as to reduce its operating speed, during the shifting action of the automatic transmission, such that reduction of the operating speed is initiated after a moment of initiation of reduction of the engaging force of the lock-up clutch by the lock-up clutch control means.

In the integrated vehicle engine/transmission control apparatus constructed according to the first aspect of this invention described above, the reduction of the engine speed by the engine speed control means is initiated after the reduction of the engaging force of the lock-up clutch by the lock-up clutch control means 106 to reduce a shifting shock of the automatic transmission. Accordingly, the reduction of the engine speed is initiated only after a moment of initiation of a releasing or slipping action of the lock-up clutch, so that the shifting shock of the automatic transmission can be effectively reduced.

According to one preferred form of the apparatus of the first aspect of the invention, the lock-up clutch control means is operable to hold the lock-up clutch in a fully released or partially engaged state thereof for a predetermined time, for thereby temporarily reducing the engaging force of the lock-up clutch. In this arrangement, the reduction of the engine speed by the engine speed control means is initiated after the lock-up clutch has been placed in its fully released state or in its partially engaged or slipping state, so that the shifting shock of the automatic transmission can be effectively reduced.

According to another preferred form of the integrated vehicle engine/transmission control apparatus of the first aspect of the invention, the automatic transmission includes a first and a second hydraulically operated frictional coupling device, and the shifting action of the automatic transmission is effected by a releasing action of the first frictional coupling device and an engaging action of the second frictional coupling device, the apparatus further comprising hydraulic pressure control means for controlling hydraulic pressures to be applied to the first and second frictional coupling devices to effect the shifting action of the automatic transmission, such that reduction of the hydraulic pressure of the first frictional coupling device is initiated after the moment of initiation of reduction of the engaging force of the lock-up clutch, and such that an increase of the hydraulic pressure of the second frictional coupling device is initiated such that there exists a fully releasing period during which both of the first and second frictional coupling devices are held in fully released states thereof, and wherein the engine speed control means is operable to reduce the operating speed of the engine at a predetermined rate during the fully releasing period. In this arrangement, the engine speed is reduced during the fully releasing period in which the engaging force of the lock-up clutch is held at a reduced value. Accordingly, the present arrangement is effective to reduce the shifting shock of the automatic transmission due to an inertia torque generated by the reduction of the engine speed.

The object indicated above may also be achieved according to a second aspect of the present invention, which provides an integrated vehicle engine/transmission control apparatus for an automotive vehicle having an engine capable of changing an operating speed thereof by itself, and an automatic transmission operatively connected to the engine and including a plurality of hydraulically operated frictional coupling devices, the apparatus comprising: (a) engine-speed-control feasibility determining means for determining whether the automotive vehicle is placed in a state that permits the engine to reduce its operating speed by itself; and (b) hydraulic pressure control means for controlling hydraulic pressures to be applied to selected ones of the plurality of hydraulically operated frictional coupling devices which are operated to effect a required shifting action of the automatic transmission, and wherein the hydraulic pressure control means is operable in one of different control modes which is selected depending upon whether the engine-speed-control feasibility determining means has determined that the vehicle is placed in the state permitting the engine to reduce its operating speed by itself.

In the integrated vehicle engine/transmission control apparatus constructed according to the second aspect of this invention described above, the hydraulic pressures to be applied to the first and second frictional coupling devices can be suitably controlled in the adequate control mode selected depending upon whether it is feasible to reduce the engine speed by itself, or according to the degree of feasibility of the engine to reduce its operating speed.

The object indicated above may also be achieved according to a third aspect of this invention, which provides an integrated vehicle engine/transmission control apparatus for an automotive vehicle having an engine capable of changing an operating speed thereof by itself, and an automatic transmission operatively connected to the engine and including a plurality of hydraulically operated frictional coupling devices which include a first and a second frictional coupling device which are respectively released and engaged to effect a required shifting action of the automatic transmission, the apparatus comprising: (a) engine-speed-control feasibility determining means for determining whether the automotive vehicle is placed in a state that permits the engine to reduce its operating speed by itself; and (b) hydraulic pressure control means operable in a first control mode when the engine-speed-control feasibility determining means has determined that the automotive vehicle is not placed in the above-indicated state, for reducing a hydraulic pressure to be applied to the first frictional coupling device for effecting the releasing action thereof, and increasing a hydraulic pressure to be applied to the second frictional coupling device for effecting the engaging action thereof, to effect the required shifting action, such that there exists a slipping period during which a drive torque is transmitted through both of the first frictional coupling device in the process of its releasing action and the second frictional coupling device in the process of its engaging action, the hydraulic pressure control means being operable in a second control mode when the engine-speed-control feasibility determining means has determined that the automotive vehicle is placed in the above-indicated state, for first reducing the hydraulic pressure to be applied to the first frictional coupling device and then increasing the hydraulic pressure to be applied to the second frictional coupling device, such that there exists a fully releasing period during which both of the first and second frictional coupling devices are held in fully released states thereof.

In the integrated vehicle engine/transmission control apparatus according to the third aspect of this invention, the hydraulic pressures to be applied to the first and second frictional coupling devices for effecting the respective releasing and engaging actions to effect the required shifting action of the automatic transmission can be suitably controlled in the adequate control mode selected depending upon whether it is feasible to reduce the engine speed by itself According to one preferred form of the third aspect of this invention, the integrated vehicle engine/transmission control apparatus further comprises engine speed control means for controlling the engine so as to reduce its operating speed during the above-indicated fully releasing period. In this arrangement, the engine speed is positively reduced to a value corresponding to the operating position of the automatic transmission to be established by the required shifting action, so that the shifting shock due to an inertia torque of the engine is effectively reduced.

The object indicated above may also be achieved according to a fourth aspect of the present invention, which provides an integrated vehicle engine/transmission control apparatus for an automotive vehicle having an engine capable of changing an operating speed thereof by itself, and an automatic transmission operatively connected to the engine, the apparatus comprising: (a) engine speed control means for controlling the engine so as to reduce its operating speed, during a shifting action of the automatic transmission; (b) running mode detecting means for detecting a running mode of the automotive vehicle; and (c) engine-speed-reduction-rate changing means for changing a rate of reduction of the operating speed of the engine by the engine speed control means, on the basis of the running mode detected by the running mode detecting means.

In the integrated vehicle engine/transmission control apparatus constructed according to the fourth aspect of this invention, the engine-speed-reduction-rate changing means is arranged to change a rate of reduction of the operating speed of the engine by the engine speed control means during the shifting action of the automatic transmission, on the basis of the running mode detected by the running mode detecting means. For instance, the engine speed during a shift-up operation of the automatic transmission is reduced at the rate suitable for the presently selected running mode of the vehicle, so that the shifting shock of the automatic transmission can be effectively reduced, and the drivability of the vehicle is accordingly improved.

According to one preferred form of the fourth aspect of the invention described above, the automotive vehicle is operable in a selected one of: a manual shifting mode in which the automatic transmission can be manually shifted; a sporty running mode in which the automatic transmission is automatically shifted so as to improve an accelerating performance of the automotive vehicle; an economical running mode in which the automatic transmission is automatically shifted so as to improve fuel economy of the engine; and a slippery-road running mode in which the automatic transmission is automatically shifted to a forward drive position having a comparatively low speed ratio, so that an output torque of the automatic transmission is smaller in the slippery-road running mode than in the other running modes, in particular, upon starting or acceleration of the vehicle. In this arrangement, the engine speed during a shift-up action of the automatic transmission can be reduced at a rate suitable for the presently selected one of the manual shifting mode, sporty running mode, economical running mode and slippery-road running mode.

The object indicated above may also be achieved according to a fifth aspect of this invention, which provides an integrated vehicle engine/transmission control apparatus for an automotive vehicle having an engine capable of changing an operating speed thereof by itself, and an automatic transmission operatively connected to the engine, the apparatus comprising: (a) engine speed control means for controlling the engine so as to reduce its operating speed, during a shifting action of the automatic transmission; and (b) learning control means for changing a learning compensation value of the automatic transmission, on the basis of a result of control of the engine by the engine speed control means.

In the integrated vehicle engine/transmission control apparatus according to the fifth aspect of this invention, illustrated embodiment, the learning control means is arranged to effect learning compensation of the drive signal for controlling the automatic transmission during a shifting action (e.g., a shift-up action), according to a learning compensation value which is changed on the basis of a state in which the engine speed has been reduced so as to reduce a shifting shock of the automatic transmission, under the control of the engine speed control means. For instance, the learning compensation value is determined or changed depending upon whether the reduction of the engine speed has been effected under the control of the engine speed control means, or on the basis of the amount of reduction of the engine speed under the control of the engine speed control means. Thus, the shifting action of the automatic transmission can be suitably controlled depending upon the engine operating state, so as to effectively reduce the shifting shock.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which:

FIG. 2 is a table indicating a relationship between combinations of operating states of the frictional coupling devices of the automatic transmission and operating positions of the automatic transmission which are established by the respective combinations;

FIGS. 9A and 9B are views indicating data maps indicative of learning compensation values of drive signals to be applied to linear solenoid valves for controlling engaging pressures of frictional coupling devices of the automatic transmission and a lock-up clutch, which are used by learning control means of FIG. 8, FIG. 9A indicating the learning compensation values used for shift-up actions of the automatic transmission to be effected such that there exists a slipping period during which two frictional coupling devices are both placed in slipping states in the process of the shift-up action, and FIG. 9B indicating the learning compensation values used for shift-up actions to be effected such that there exists a fully releasing period during which the two frictional coupling devices are both placed in fully released states;

DETAILED DESCRIPTION OF THE PREFERRED EMBODIMENTS

Figure 1:
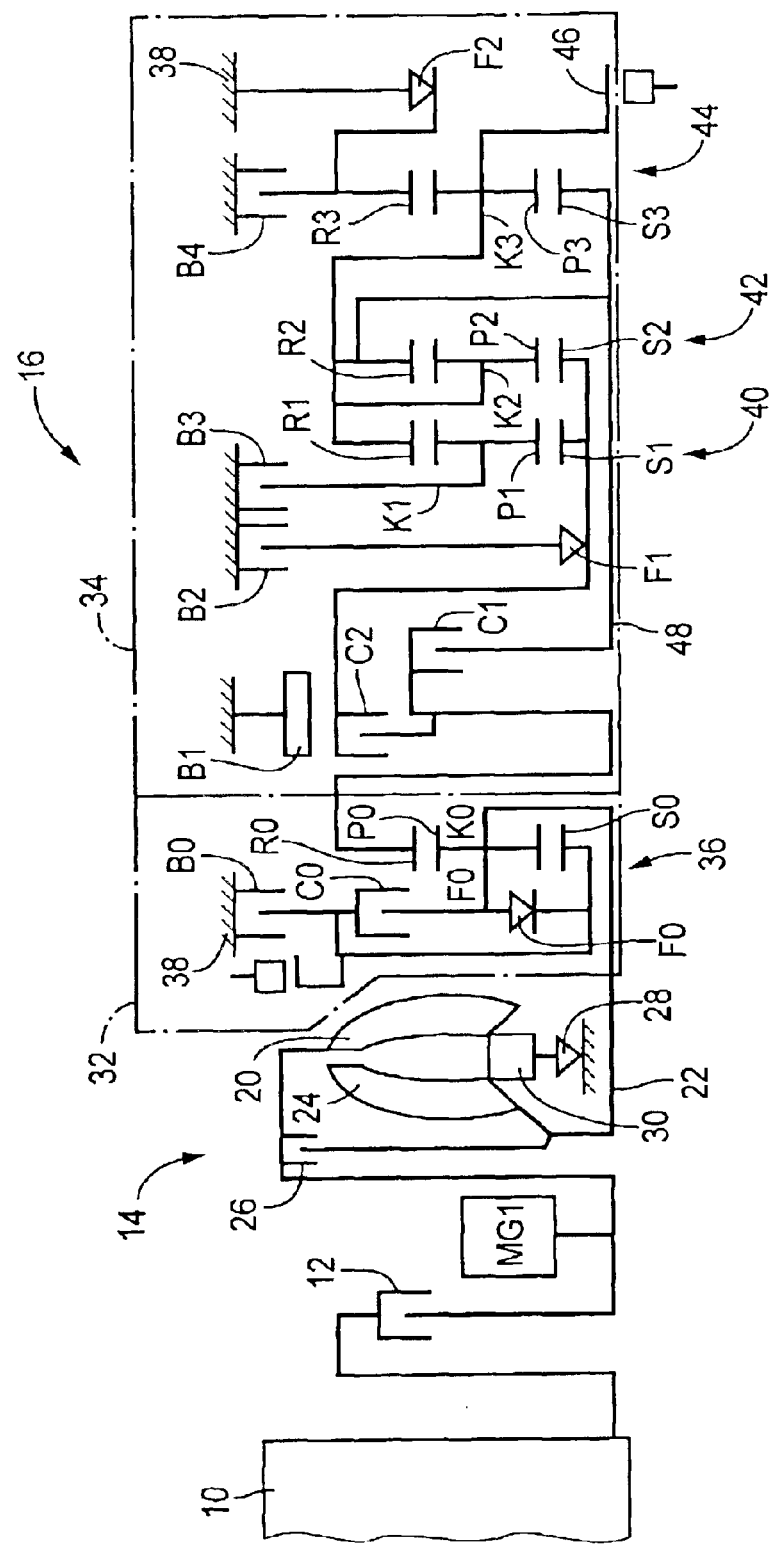
FIG. 1 is a schematic view showing a part of a drive system of an automotive vehicle, which includes an engine and an automatic transmission having hydraulically operated frictional coupling devices, and which is controlled by an integrated vehicle engine/transmission control apparatus according to one embodiment of this invention.

Referring first to the schematic view of FIG. 1, there is shown an arrangement of a drive system of an automotive vehicle having an integrated engine/transmission control apparatus constructed according to one embodiment of this invention. The drive system includes a drive power source in the form of an engine 10, a clutch 12, a torque converter 14 and an automatic transmission 16. An output of the engine 10 is transmitted to the automatic transmission 16 through the clutch 12 and torque converter 14, and is transmitted from the automatic transmission 16 to drive wheels through a differential gear device and drive axles, which are well known in the art and are not shown. Between the clutch 12 and the torque converter 14, there is disposed a first motor/generator MG1 which functions as an electric motor and an electric generator. The torque converter 14 includes: a pump impeller 20 connected to the clutch 12; a turbine impeller 24 connected to an input shaft 22 of the automatic transmission 16; a lock-up clutch 26 for directly connecting the pump and turbine impellers 20, 24; a one-way clutch 28; and a stator impeller 30 which is prevented by the one-way clutch 28 from rotating in one of opposite directions.

The automatic transmission 16 includes a first transmission unit 32 having two speed positions, that is, a high-speed position and a low-speed position, and a second transmission unit 34 having five operating positions, that is, one reverse drive position and four forward drive positions. The first transmission unit 32 includes a high-low switching planetary gear device 36 having a sun gear S0, a ring gear R0, a carrier K0, and planetary gears P0 which are rotatably supported by the carrier K0 and which mesh with the sun gear S0 and ring gear R0. The first transmission unit 32 further includes a clutch C0 and a one-way clutch F0 disposed between the sun gear S0 and the carrier K0, and a brake B0 disposed between the sun gear S0 and a housing 38.

The second transmission unit 34 includes a first planetary gear set 40, a second planetary gear set 42, and a third planetary gear set 44. The first planetary gear set 40 includes a sun gear S1, a ring gear R1, a carrier K1, and planetary gears P1 which are rotatably supported by the carrier K1 and which mesh with the sun gear S1 and ring gear R1. The second planetary gear set 42 includes a sun gear S2, a ring gear R2, a carrier K2, and planetary gears P2 which are rotatably supported by the carrier K2 and which mesh with the sun gear S2 and ring gear R2. The third planetary gear set 44 includes a sung gear S3, a ring gear R3, a carrier K3, and planetary gears P3 which are rotatably supported by the carrier K3 and which mesh with the sun gear S3 and ring gear R3.

The sun gears S1 and S2 are integrally connected to each other, while the ring gear R1 and carriers K1 and K2 are integrally connected to each other. The carrier K3 is connected to an output shaft 46 of the automatic transmission 16. A clutch C1 is disposed between the ring gear R0 and an intermediate shaft 48 connected to the sun gear S3, while a clutch C2 is disposed between the sun gears S1 and S2 and the ring gear R0. A brake B1 of band type for inhibiting rotation of the sun gears S1 and S2 is fixed to the housing 38. A one-way clutch F1 and a brake B2 are disposed in series with each other between the sun gears S1 and S2 and the housing 38. This one-way clutch F1 is engaged when the sun gears S1 and S2 receive a torque so as to be rotated in a direction opposite to the direction of rotation of the input shaft 22.

A brake B3 is disposed between the carrier K1 and the housing 38, while a brake B4 and a one-way clutch F2 are disposed in parallel with each other between the ring gear R3 and the housing 38. This one-way clutch F2 is engaged when the ring gear R3 receives a torque so as to be rotated in the direction opposite to the direction of rotation of the input shaft 22.

The automatic transmission 16 constructed as described above has one reverse drive position and five forward drive positions, which are selectively established by engagement of respective combinations of frictional coupling devices in the form of the clutches C0–C2, brakes B0–B4 and one-way clutches F0-F2, as indicated in the table of FIG. 2 by way of example. In FIG. 2, "○" indicates the engaged state of each frictional coupling device, and the absence of any symbol indicates the released state of each frictional coupling device. "◎" indicates the engagement of the appropriate frictional coupling device for applying an engine brake to the vehicle, and "Δ" indicates the engagement of the appropriate frictional coupling device, which does not contribute to transmission of power. It will be understood from the table of FIG. 2 that a 2–3 shift-up action of the automatic transmission 16 from a $2^{nd}$-speed position to a $3^{rd}$-speed position is a so-called "clutch-to-clutch" shifting action which is effected by an engaging action of the brake B2 and a releasing action of the brake B3 which take place concurrently with each other. In the process of this 2–3 shift-up action of the automatic transmission 16, there exists a slipping period during which a drive torque is transmitted through both the brake B3 in the process of its releasing action and the brakes B2 in its engaging action. Where the operating speed of the engine 10 can be reduced by controlling the operating timings of intake and exhaust valves 74, 75, there is provided a fully releasing period during which the two brakes B2, B2 are both placed in their released states. The above-indicated clutches C0–C2 and brakes B0–B4 are hydraulically operated frictional coupling devices each of which is actuated by a hydraulic actuator.

The engine 10 is provided with a turbocharger (turbosupercharger) 54, and is operated with a fuel injected into its cylinders. This engine 10 is a so-called "lean-burn" engine which is operated with an air-fuel mixture whose air/fuel ratio A/F is higher than the stoichiometric value, while the engine 10 is in a low-load condition. The engine 10 has two banks of cylinders 10A and 10B disposed on the right and left sides. Each bank consists of three cylinders. The engine 10 is arranged such that the cylinders of one of the two banks 10A, 10B or the cylinders of both of the two banks 10A, 10B are operated simultaneously. Thus, the number of the cylinders to be operated can be changed.

Figure 3:
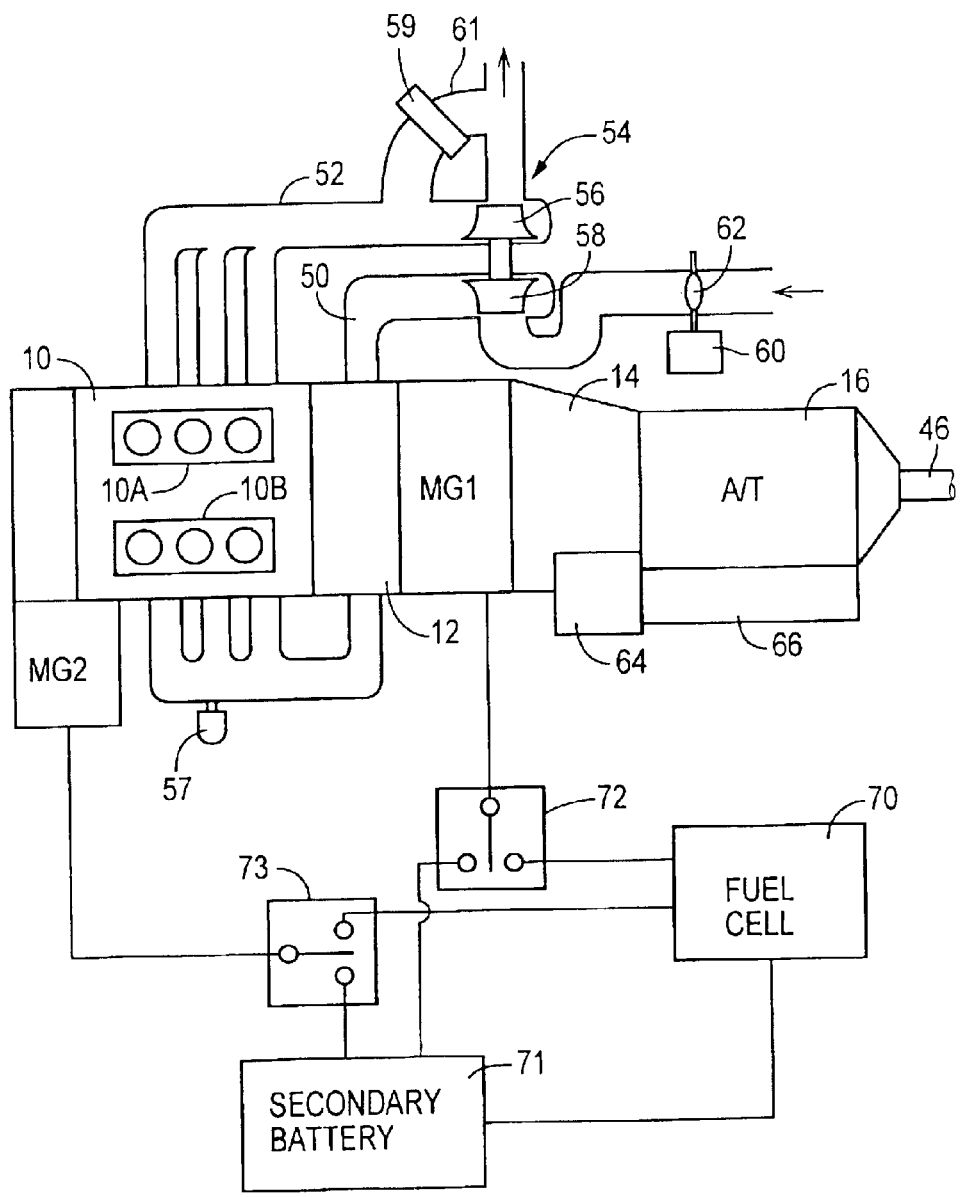
FIG. 3 is a view showing various devices of the vehicle drive system of FIG. 1 including the engine and automatic transmission.

As indicated in FIG. 3, the engine 10 has an intake pipe 50, an exhaust pipe 52, and the turbocharger 54 is disposed so as to bridge the intake and exhaust pipes 50, 52. The turbocharger 54 includes a turbine impeller 56 which is rotated by a stream of exhaust emission from the engine 10 through the exhaust pipe 52, and a pump impeller 58 which is disposed in the intake pipe 50 so as to compress an intake air and which is connected to the turbine impeller 56 so that the pump impeller 58 is rotated by the turbine impeller 56. A by-pass passage 61 which by-passes the turbine impeller 56 is connected to the exhaust pipe 52 such that the by-pass-passage 61 is disposed in parallel with a portion of the exhaust pipe 52 in which the turbine impeller 56 is provided. The by-pass passage 61 is provided with an exhaust waste gate valve 59 which is controlled to change a ratio of a volume of the exhaust emission flowing to drive the turbine impeller 56, to a volume of the exhaust emission flowing through the by-pass passage 61, for thereby adjusting a turbocharging pressure Pa within the intake pipe 50. The turbocharger 54 of exhaust turbine type may be replaced by a turbocharger of mechanical type driven by the engine 10 or an electric motor.

A throttle valve 62 is disposed within the intake pipe 50 of the engine 10. The throttle valve 62 is operated by a throttle actuator 60 such that an angle of opening $\theta_{TH}$ of the throttle valve 62 is in principle controlled to a value corresponding to an operating amount $\theta_{ACC}$ of an accelerator pedal (not shown). However, the angle of opening $\theta_{TH}$ determined by the operating amount $\theta_{ACC}$ is automatically adjusted by an electronic control unit 90 (which will be described), depending upon various running conditions of the vehicle, so as to adjust the output of the engine 10. For instance, the angle of operating $\theta_{TH}$ is adjusted depending upon whether the automatic transmission 16 is in a shifting action or not.

As also shown in FIG. 3, the first motor/generator MG1 is disposed between the engine 10 and the automatic transmission 16, such that the clutch 12 is disposed between the engine 10 and the first motor/generator MG1. The vehicle drive system further includes a hydraulic control unit 66 which receives a pressurized fluid from an electrically operated hydraulic pump 64 and which controls the hydraulically operated frictional coupling devices of the automatic transmission 16 and the lock-up clutch 26. A second motor/generator MG2 is operatively connected to the engine 10, as indicated in FIG. 3. The vehicle drive system further includes a fuel cell 70 and a secondary battery 71 which serve as an electric power source for the first motor/generator MG1 and the second motor/generator MG2, and also includes two switching devices 72, 73 which are arranged to control amounts of electric current to be applied from the fuel cell 70 and the secondary battery 71 to the motor/generator MG1 and motor/generator MG2 when serving as the electric motors, and amounts of electric current with which the secondary battery 71 is charged by the motor/generator MG1 and motor/generator MG2 when serving as the electric generators. Each of the switching devices 72, 73 is a device capable of performing a switching function, for instance, a semiconductor switching element capable of serving as an inverter.

Figure 4:
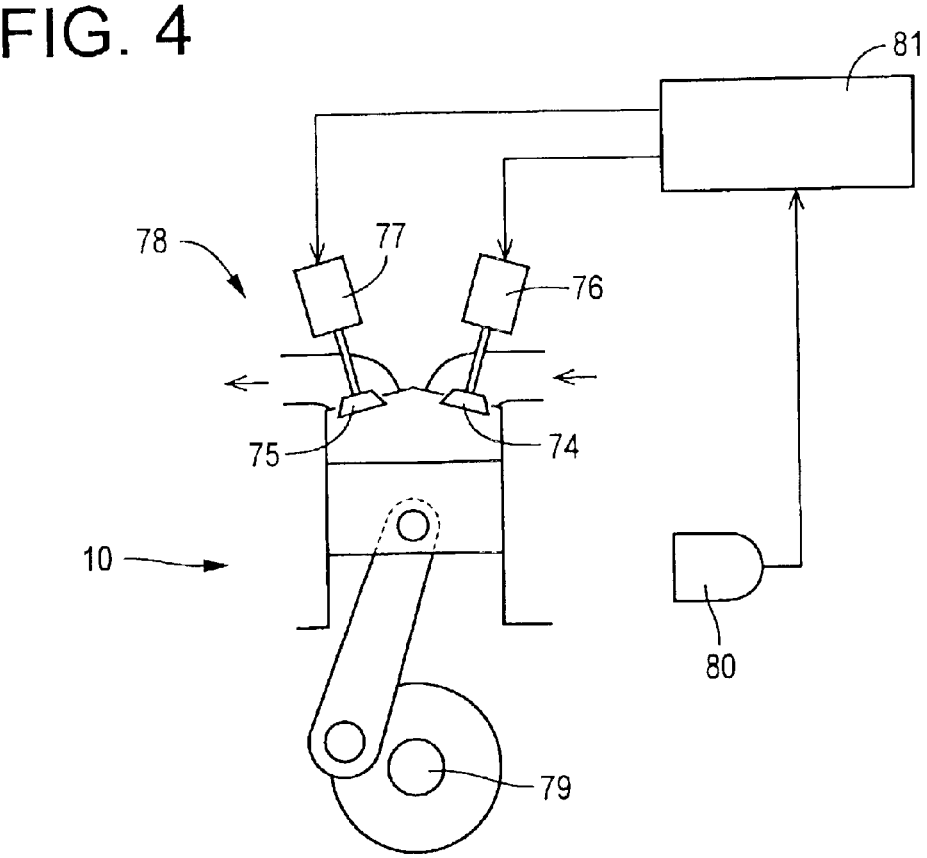
FIG. 4 is a view illustrating a variable valve mechanism provided for each cylinder of the engine.
Figure 5:
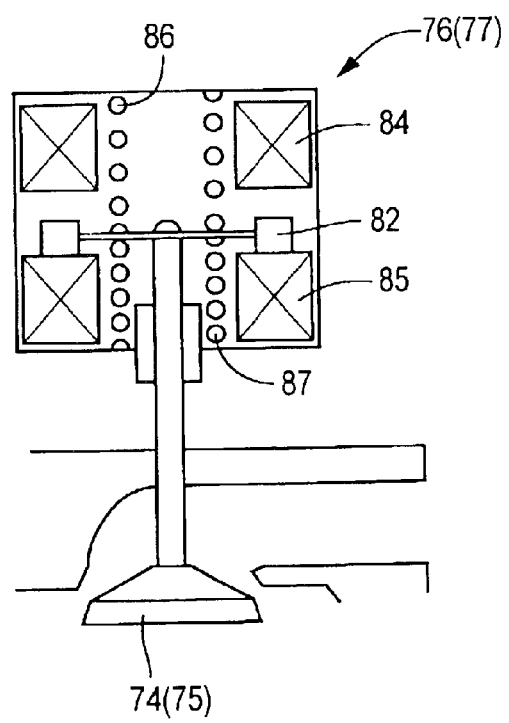
FIG. 5 is a view illustrating an arrangement of an electromagnetic actuator system provided in the variable valve mechanism of FIG. 4, for opening and closing an intake valve or an exhaust valve at a predetermined timing.

As shown in FIG. 4, the engine 10 is provided with a variable valve mechanism 78 and a valve drive control device 81. The variable valve mechanism 78 includes an electromagnetic actuator 76 for opening and closing the intake valve 74 of each cylinder, and an electromagnetic actuator 77 for opening and closing the exhaust valve 75 of each cylinder. The valve drive control device 81 is arranged to control the opening and closing timings of the intake and exhaust valves 74, 75, according to an output signal of an angular position sensor 80 for detecting an angular position of a crankshaft 79 of the engine 10. The valve drive control device 81 not only optimizes the opening and closing timings of the intake and exhaust valves 74, 75 depending upon a load acting on the engine 10, but also adjusts the opening and closing timings to be adapted to one of a 4-cycle operating mode and a 2-cycle operating mode which is selected according to a mode selecting signal. Each of the electromagnetic actuators 76, 77 includes a circular disc-like movable member 82 made of a magnetic material, which is connected to the intake or exhaust valve 74, 75 such that the movable member is movable in the axial direction of the valve 74, 75. The electromagnetic actuator 76, 77 further includes a pair of electromagnets 84, 85 disposed on the respective opposite sides of the movable member 82, and a pair of springs 86, 87 biasing the movable member 82 to its neutral position between the two electromagnets 84, 85. The movable member 82 is attracted by one of the two electromagnets 84, 85.

The engine 10 has a function of controlling its speed NE, with the valve drive control device 81 which permits the adjustment of the operating timings of the intake and exhaust valves 74, 75 of the variable valve mechanism 78 and the selection of the number of the operating cylinders. That is, the resistance to a rotary motion of the crankshaft 79 of the engine 10 can be increased or reduced by controlling the operating timings of the intake and exhaust valves 74, 75 or changing the number of the operating cylinders. Accordingly, the engine speed NE can be positively or rapidly reduced at a desired rate in the process of a shift-up action of the automatic transmission 16, for example.

Figure 6:
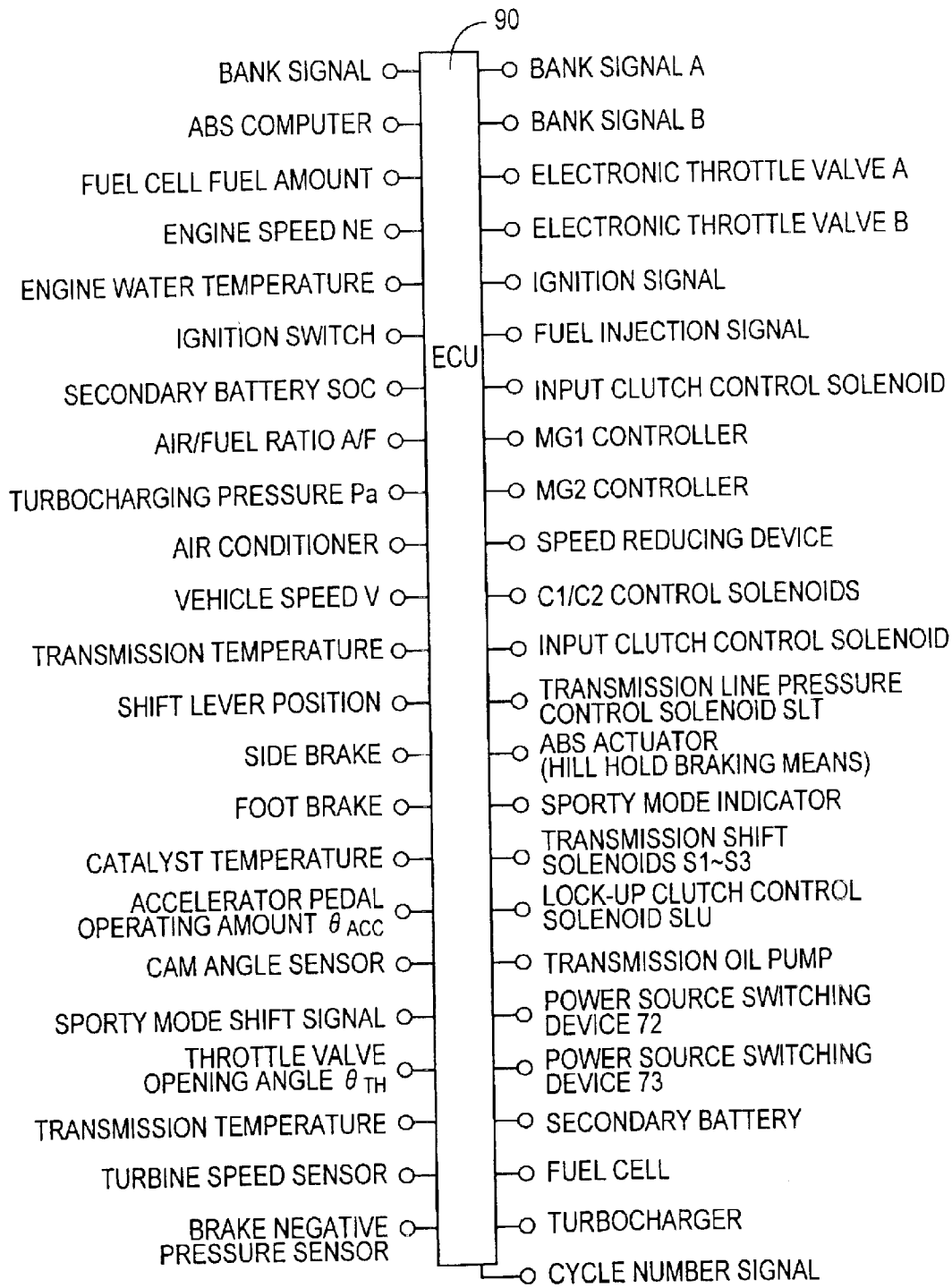
FIG. 6 is a view for explaining input and output signals of the integrated vehicle engine/transmission control apparatus in the form of an electronic control unit used for the vehicle provided with the drive system of FIG. 1.

The vehicle drive system described above is controlled by the above-indicated electronic control unit (ECU) 90, the input and output signals of which are indicated in FIG. 6. The electronic control unit 90 receives as its input signals the following output signals of various sensors (not shown): an accelerator signal indicative of the operating amount or angle $\theta_{ACC}$ of the accelerator pedal; a throttle opening angle signal indicative of the opening angle $\theta_{TH}$ of the throttle valve 62; a vehicle speed signal indicative of an operating speed $N_{OUT}$ of the output shaft 46 of the automatic transmission 16, which can be used to detect a running speed V of the vehicle; an engine speed signal indicative of the speed NE of the engine; a signal indicative of the turbocharging pressure Pa in the intake pipe 50; a signal indicative of the air/fuel ratio A/F of the air-fuel mixture; a signal indicative of a presently selected operating position $S_H$ of a shift lever; and a signal indicative of a temperature $T_{OIL}$ of working fluid used for the automatic transmission 16. The electronic control unit 90 generates the following output signals: a throttle actuator drive signal for controlling the throttle actuator 60 to operate the throttle valve 62, for establishing the throttle opening angle $\theta_{TH}$ corresponding to the operating amount $\theta_{ACC}$ of the accelerator pedal; a fuel injection signal for controlling an amount of fuel to be injected from a fuel injector valve into each cylinder of the engine 10; solenoid drive signals for controlling solenoid coils S1–S3 for driving shift control valves incorporated in the hydraulic control unit 66, to shift the automatic transmission 16 as needed; a drive signal $D_{SLU}$ for controlling a linear solenoid valve SLU to control the engaging, releasing and slipping actions of the lock-up clutch 26, to directly control the brake B1, and to control the clutch-to-clutch shift-up actions; a drive signal $D_{SLT}$ for controlling a linear solenoid valve SLT to produce a throttle pressure $P_{TH}$ corresponding to the opening angle $\theta_{TH}$ of the throttle valve 62; and a drive signal $D_{SLN}$ for controlling a linear solenoid SLN to control the back pressure of an accumulator.

Figure 7:
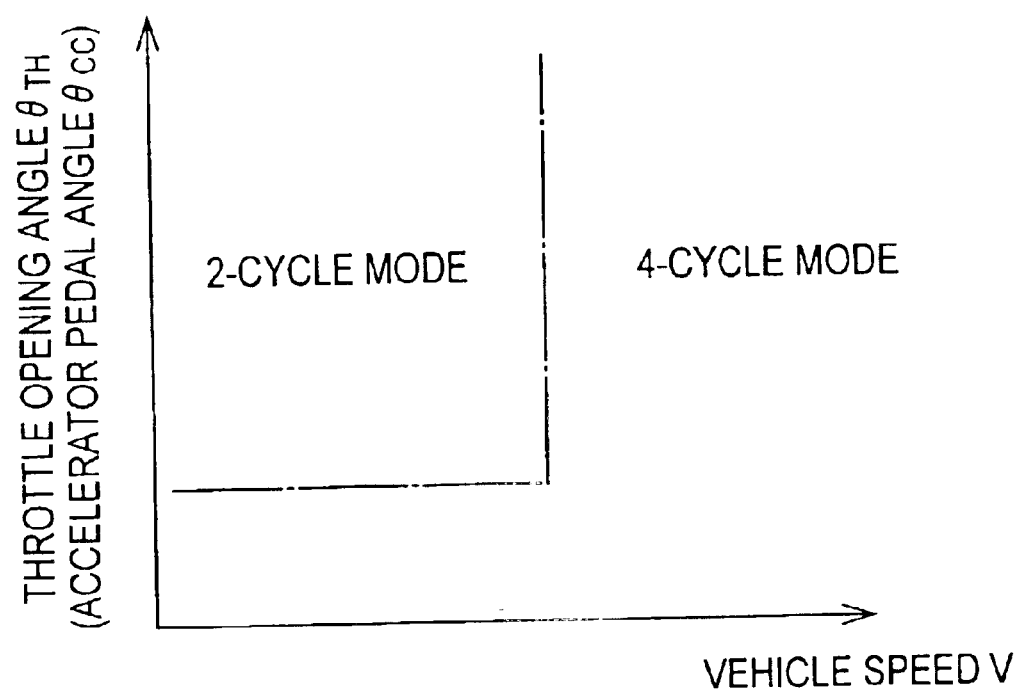
FIG. 7 is a view indicating a boundary line represented by a stored data map, which is used by the electronic control unit to select one of 2-cycle and 4-cycle operating modes of the engine.

The electronic control unit 90 includes a so-called microcomputer incorporating a central processing unit (CPU), a read-only memory (ROM), a random-access memory (RAM), and an input-output interface. The CPU operates to effect signal processing operations according to control programs stored in the ROM, while utilizing a temporary data storage function of the RAM, for executing various control routines such as: a transmission shift control routine illustrated in the flow chart of FIG. 10, for controlling the shifting actions of the automatic transmission 26; a lock-up clutch control routine for controlling the engaging, releasing and slipping actions of the lock-up clutch 26; a turbocharging pressure control routine for controlling the turbocharging pressure Pa; a cylinder-number selecting control routine for changing the number of the operating cylinders; and a mode selecting control routine for selecting one of the 2-cycle and 4-cycle operating modes. For instance, the transmission shift control routine is formulated to effect a determination as to whether the automatic transmission 16 should be shifted down or up, on the basis of the detected operating amount or angle $\theta_{ACC}$ (%) of the accelerator pedal or opening angle $\theta_{TH}$ of the throttle valve 62 and the detected vehicle running speed V, and according to predetermined shift-down and shift-up boundary lines represented by a stored data map. Namely, the determination is made as to whether a vehicle running condition defined by the detected parameters $\theta_{ACC}$ or $\theta_{TH}$ and V has moved across any one of the shift-up and shift-down boundary lines. The detected parameter $\theta_{ACC}$ or $\theta_{TH}$ represents the output of the engine 10 as desired by the vehicle operator. When any shift-up or shift-down action of the automatic transmission 16 is determined to be required, the hydraulic control circuit 66 is controlled to effect the required shift-up or shift-down action. In the process of this shifting action, an input torque $T_{IN}$ of the automatic transmission 16 is estimated, and the hydraulic engaging pressure of the hydraulically operated frictional coupling device which is engaged to effect the shifting action, or the line pressure for this hydraulic engaging pressure is adjusted to a value corresponding to the estimated input torque $T_{IN}$. The lock-up clutch control routine is formulated to select one of the fully engaged, fully released and partially slipping states of the lock-up clutch 26, on the basis of the detected operating amount or angle $\theta_{ACC}$ (%) of the accelerator pedal or opening angle $\theta_{TH}$ of the throttle valve 62 and the detected vehicle running speed V, and according to predetermined boundary lines represented by a stored data map. The lock-up clutch control solenoid valve SLU in the hydraulic control circuit 66 is controlled to place the lock-up clutch 26 in a selected one of its fully engaged, fully released and slip control states. The cylinder-number selecting control routine indicated above is formulated to reduce the number of the operating cylinders, for improving the fuel economy of the engine, when a load acting on the vehicle is relatively low, or stopping the operation of each cylinder whose variable valve mechanism 78 is found defective. The mode selecting control routine indicated above is formulated to select one of the 2-cycle and 4-cycle operating modes of the engine 10, on the basis of the detected operating amount or angle $\theta_{ACC}$ (%) of the accelerator pedal or opening angle $\theta_{TH}$ of the throttle valve 62 and the detected vehicle running speed V, and according to a predetermined boundary line represented by a stored data map. An example of the boundary line is shown in the graph of FIG. 7. The mode selecting control routine is further formulated to change the operating mode of the engine 10, so as to minimize reduction of the vehicle drivability, in the event of occurrence of an abnormality of the automatic transmission 16 or engine 10.

Figure 8:
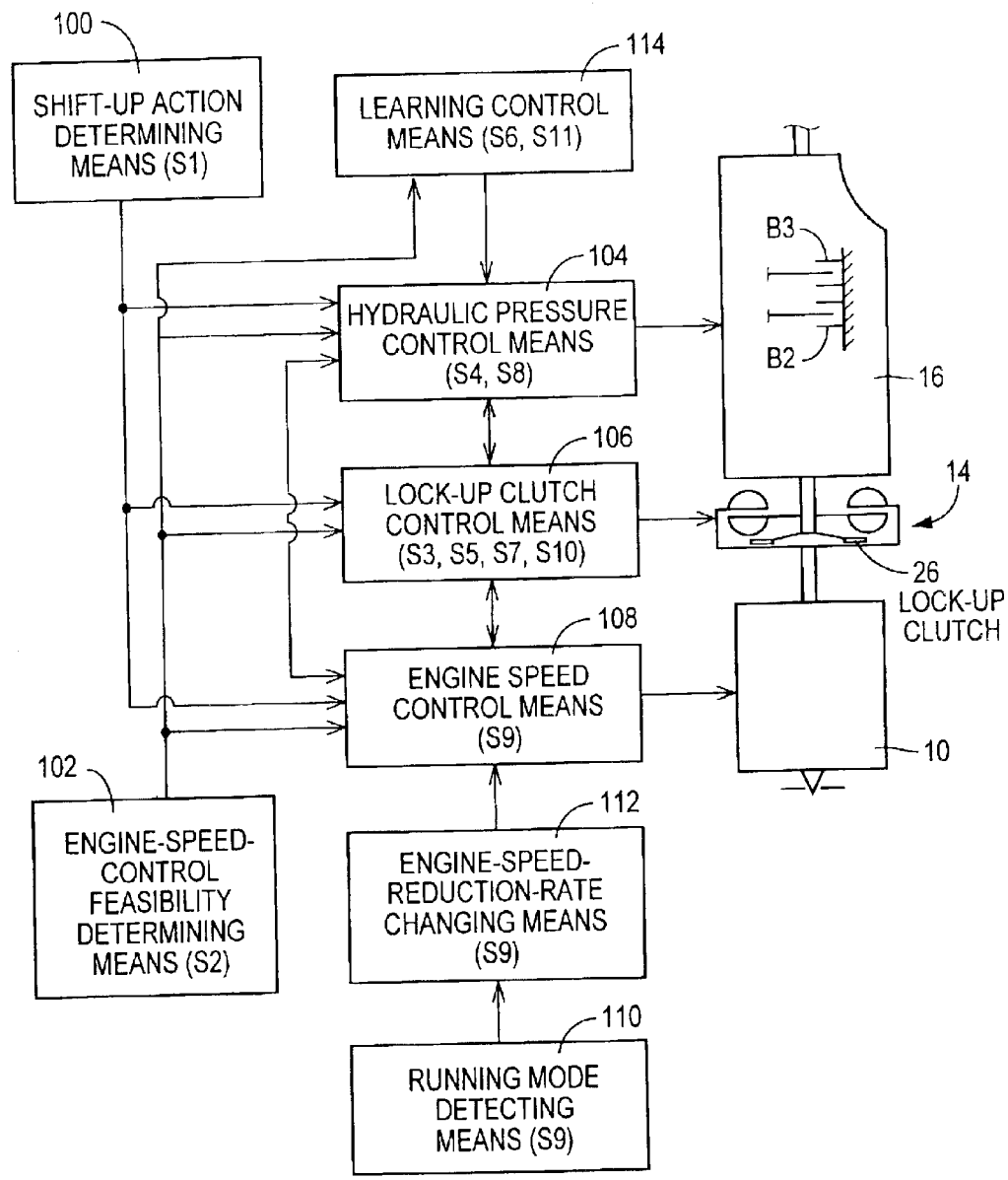
FIG. 8 is a block diagram showing major functional means of the electronic control unit of FIG. 6.

Referring next to the block diagram of FIG. 8, there are illustrated major functional means of the electronic control unit 90, which include: shift-up action determining means 100; engine-speed-control feasibility determining means 102; hydraulic pressure control means 104; lock-up-clutch control means 106; engine speed control means 108; running mode detecting means 110; engine-speed-reduction-rate changing means 112; and learning control means 114. The shift-up action determining means 100 is arranged to effect a determination as to whether the automatic transmission 16 should be shifted up, for example, from the $2^{nd}$-speed position to the $3^{rd}$-speed position should be effected. This determination is effected by determining whether the vehicle running condition as represented by a point defined by the detected vehicle speed V and throttle opening angle $\theta_{TH}$ has moved across a predetermined shift-up boundary line, for example, a 2–3 shift-up boundary line, in a direction of increase of the vehicle speed V. The engine-speed-control feasibility determining means 102 is arranged to determine whether the vehicle is placed in a state that permits the engine 10 to reduce its speed NE by itself, that is, permits the reduction of the speed NE by the engine speed control means 108 by controlling only the variable valve mechanism 78 (by controlling only the opening timings of the intake and exhaust valves 74, 75), without controlling any other devices such as the automatic transmission 16. For instance, the engine-speed-control feasibility determining means 102 determines, on the basis of the running condition of the vehicle and the operating condition of the engine 10, whether the engine speed NE can be reduced by increasing the number of the non-operating cylinders, or by controlling the opening and closing timings of the intake and exhaust valves 74, 75 so as to increase a rotating resistance of the crankshaft 79. The engine-speed-control feasibility determining means 102 determines that it is not feasible to reduce the engine speed NE, by controlling only the variable valve mechanism 78, if the combustion state of the engine 10 is unstable at a low operating temperature, or if any sensor used to control the engine 10 is defective.

The lock-up clutch control means 106 is operated upon determination by the shift-up action determining means 100 that a shift-up action of the transmission 16 should be effected. The lock-up clutch control means 106 controls the engaging force of the lock-up clutch 26 in the process of the shift-up action, in order to reduce a shifting shock of the automatic transmission 16. For example, the lock-up clutch control means 106 is arranged to immediately reduce the engaging force of the lock-up clutch 26, by placing the lock-up clutch 26 in its fully released state or partially engaged state (slipping state), so that the force of connection between the engine 10 and the automatic transmission 16 is reduced. After the shift-up action is completed, that is, after the engaging pressure $P_{B2}$ of the brake B2 is raised to a predetermined value under the control of the hydraulic pressure control means 104 (which will be described), in the case of the 2–3 shift-up action, the lock-up clutch control means 106 restores the lock-up clutch 26 to its original state (fully engaged state).

The hydraulic pressure control means 104 is operated upon determination by the shift-up action determining means 100 that a shift-up action should be effected. The hydraulic pressure control means 104 controls the engaging pressures of the hydraulically operated frictional coupling devices which are engaged or released to effect the shift-up action. In the case of the 2–3 shift-up action, the hydraulic pressure control means 104 reduces the engaging pressure $P_{B3}$ of the brake B3 which has been placed in the fully engaged state, and increase the engaging pressure $P_{B2}$ of the brake B2 which has been placed in the fully released state. Thus, the 2–3 shift-up action of the automatic transmission 16 is achieved by the engaging and releasing actions of the respective brakes B3, B2. Described in greater detail, if the engine-speed-control feasibility determining means 102 determines that it is not feasible to reduce the engine speed NE by controlling only the variable valve mechanism 78 of the engine 10, the hydraulic pressure control means 104 controls the engaging pressures $P_{B3}$, $P_{B2}$ of the brakes B3, B2 so as to effect the clutch-to-clutch 2–3 shift-up action in a normal manner, that is, in a first control mode in which the engaging pressure $P_{B3}$ of the brake B3 is reduced while at the same time the engaging pressure $P_{B2}$ of the brake B2 is raised, such that there exists a slipping period during which a drive torque is transmitted through both the brake B3 in the process of its releasing action and the brakes B2 in its engaging action, namely, through both of the brakes B3, B2 placed in their slipping states. If the engine-speed-control feasibility determining means 102 determines that it is feasible to reduce the engine speed NE by controlling only the variable valve mechanism 78, the hydraulic pressure control means 104 controls the engaging pressures $P_{B3}$, $P_{B2}$ of the brakes B3, B2, in a second control mode in which the engaging pressures $P_{B3}$, $P_{B2}$ of the brakes B3, B2 are respectively reduced and raised such that there exists a fully releasing period "A" during which both of the brakes B2, B2 are placed in their fully released states, as indicated in the time chart of FIG. 11. In this case, there exists a time spacing between a period during which a drive torque is transmitted through the brake B3 in the process of its releasing action and a period during which a drive torque is transmitted through the brake B2 in its engaging action. Thus, depending upon whether the engine speed NE can be reduced by the engine speed control means 108 by controlling only the variable valve mechanism 78 of the engine 10, that is, depending upon whether the engine-speed-control feasibility determining means 102 determines that it is feasible to reduce the engine speed NE, the hydraulic pressure control means 104 selects one of the first and second control modes in which the engaging pressures $P_{B3}$, $P_{B2}$ of the brakes B3, B2 are controlled to achieve the 2–3 shift-up action, for example. An increase of the engaging pressure $P_{B2}$ of the brake B2 by the hydraulic pressure control means 104 is initiated only after the reduction of the engine speed NE by the engine speed control means 108 is completed, that is only after the engine speed NE has been lowered to a value NE3 corresponding to the $3^{rd}$-speed position of the automatic transmission 16. Although the present embodiment is adapted such that there is established the fully releasing period "A" or the slipping period depending upon it is feasible to reduce the engine speed NE by controlling only the variable valve mechanism 78 of the engine 10, the hydraulic pressure control means 104 may be adapted to change the slipping period (during which a drive torque is transmitted through both of the brake B3 in the process of the releasing state and the brake B2 in the process of the engaging state), on the basis of the rate of reduction of the engine speed NE by the engine speed control means 108.

The engine speed control means 108 is operated upon determination by the shift-up action determining means 100 that the shift-up action of the automatic transmission 16 should be effected, and upon determination by the engine-speed-control feasibility determining means 102 that it is feasible to reduce the engine speed NE by controlling only the engine 10. In this event, the engine speed control means 108 initiates the reduction of the engine speed NE by controlling the operating timings of the intake and exhaust valves 74, 75, after the initiation of reduction of the engaging force of the lock-up clutch 26 by the lock-up clutch control means 106, such that the engine speed NE is reduced in the process of the shift-up action, for instance, in the process of the 2–3 shift-up action, at a predetermined rate from a value NE2 corresponding to the $2^{nd}$-speed position to a value NE3 corresponding to the $3^{rd}$-speed position, as indicated in the time chart of FIG. 11. Even when the shift-up action determining means 100 determines that the automatic transmission 16 should be shifted up, the engine speed control means 108 is not operated to reduce the engine speed NE, if the engine-speed-control feasibility determining means 102 determines that it is not feasible for the engine speed control means 108 to reduce the engine speed NE. In this event, the hydraulic pressure control means 104 controls the engaging pressures $P_{B3}$, $P_{B2}$ of the brakes B3, B2, in the conventional first control mode, so as to effect the so-called "clutch-to-clutch" shift-up action with concurrent releasing and engaging actions of the respective brakes B3, B2 so as to establish the above-discussed slipping period, so that the engine speed NE is positively reduced by means of the clutch-to-clutch shift-up action. Alternatively, the engine speed NE in the above event may be reduced by a combination of a modification of the conventional clutch-to-clutch shift-up action of the automatic transmission 16 (first control mode) and a modification of the second control mode.

The running mode detecting means 110 is arranged to detect a presently established or selected one of a plurality of running modes of the vehicle, which consist of: a manual shifting mode in which the automatic transmission 16 can be manually shifted up or down; a sporty running mode in which the automatic transmission 16 is automatically shifted so as to improve the accelerating performance or drivability of the vehicle; an economical running mode in which the automatic transmission 16 is automatically shifted so as to improve the fuel economy of the engine 10; and a slippery-road running mode in which the automatic transmission 16 is automatically shifted to select a forward drive position having a relatively low speed ratio so as to reduce a vehicle drive force. The engine-speed-reduction-rate changing means 112 is arranged to change or determine the rate of reduction of the engine speed NE by the engine speed control means 108, on the basis of the detected presently established running mode of the vehicle and according to a predetermined relationship between the running mode and the rate of reduction of the engine speed NE, which relationship is represented by a stored data map. For instance, the engine-speed-reduction-rate changing means 112 determines the rate of reduction of the engine speed NE such that the rate is relatively high when the manual shifting mode or sporty running mode is established than when the economical running mode is established. The engine speed control means 108 reduces the engine speed NE in the process of the shift-up action of the automatic transmission 16, at the rate as determined by the engine-speed-reduction-rate changing means 112.

Figure 11:
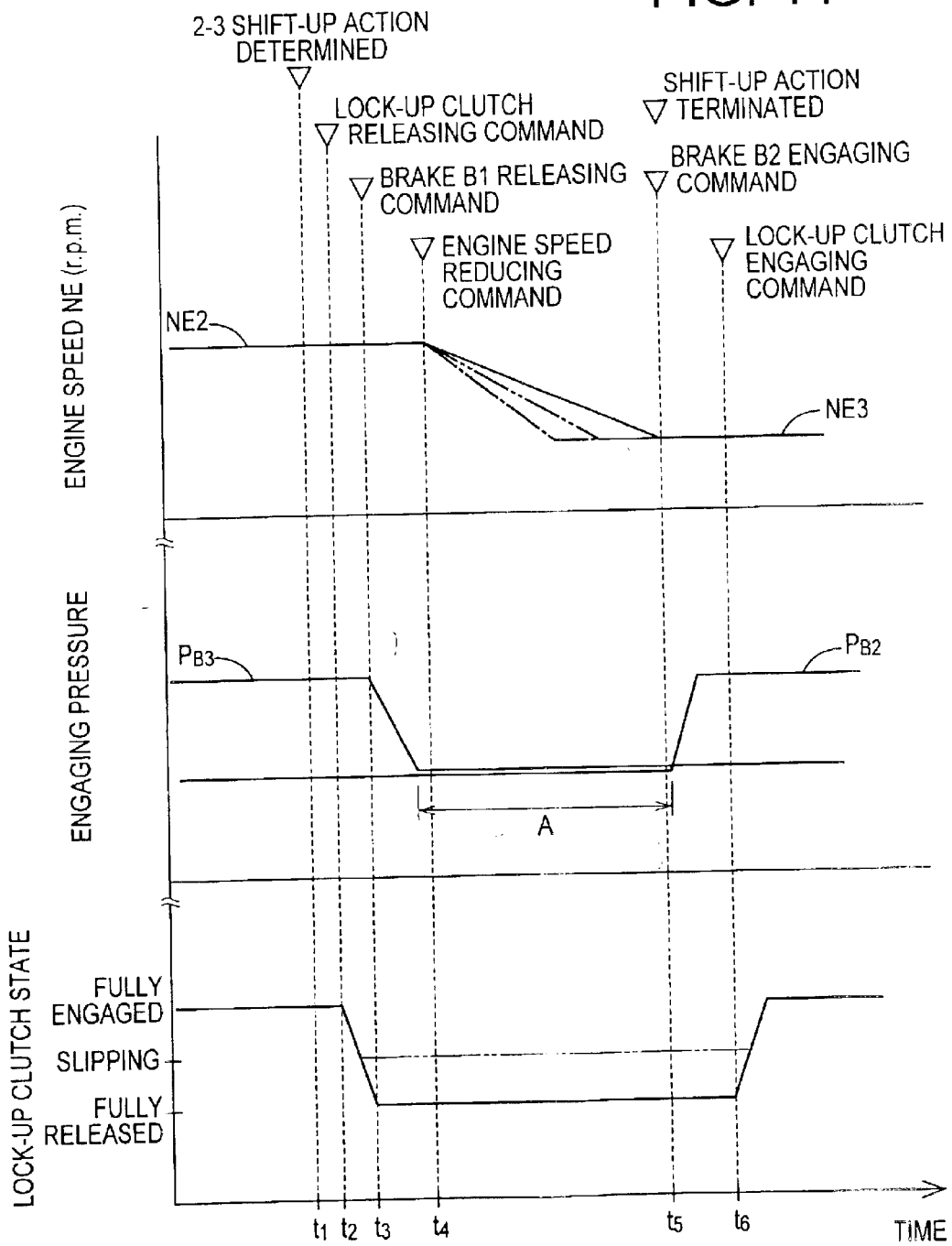
FIG. 11 is a time chart indicating changes of various parameters when the engine and the automatic transmission are controlled by the electronic control unit of FIG. 6.

The learning control means 114 is arranged to effect learning compensation of drive signals to be applied to the linear solenoid valves SLN and SLU for controlling the engaging pressures of the frictional coupling devices such as the brakes B3, B2 and the engaging pressure of the lock-up clutch 26, so as to eliminate variations in the operating characteristics of the frictional coupling devices and lock-up clutch 26 due to differences of their friction coefficient and chronological changes of the friction coefficient, so that a length of time from the moment of generation of a command to effect the shift-up action (e.g., 2–3 shift-up action) to the moment of initiation of the inertia phase of the automatic transmission 16 coincides with a target value, and so that an amount of racing rise of the rotating speed of the input shaft 22 in the process of the shift-up action is held within a predetermined range. The learning control means 114 effects the learning compensation of the drive signals for the linear solenoid valves SLN, SLU for controlling the engaging pressures of the frictional coupling devices and lock-up clutch 26, depending upon whether the engine-speed-control feasibility determining means 102 determines that it is feasible to reduce the engine speed NE, and depending upon the specific shift-up actions to be achieved by the hydraulic pressure control means 104. The drive signal obtained by the learning compensation in the present shift-up action is used as an initial value in the next shift-up action. FIG. 9A shows an example of a set of learning compensation values used when the engine-speed-control feasibility determining means 102 determines that it is not feasible to reduce the engine speed NE by the engine speed control means 108, that is, when the clutch-to-clutch shift-up action is achieved in the first control mode such that there exists the above-indicated slipping period during which a drive torque is transmitted through both of the appropriate two frictional coupling devices (brakes B3 and B2 in the case of the 2–3 shift-up action) in the process of the respective releasing and engaging actions. On the other hand, FIG. 9B shows an example of a set of learning compensation values used when the engine-speed-control feasibility determining means 102 determines that it is feasible to reduce the engine speed NE, that is, when the clutch-to-clutch shift-up action is achieved in the second control mode such that there exists the above-indicated fully releasing period "A" during which both of the two frictional coupling devices (B3, B3) are placed in their fully released states, as indicated in FIG. 11. Thus, the learning control means 114 effects the learning compensation of the engaging pressures of the frictional coupling devices and the lock-up clutch 26, in different manners depending upon whether the engine speed NE can be reduced by the engine speed control means 108 by controlling only the variable valve mechanism 78 of the engine 10.

Figure 10:
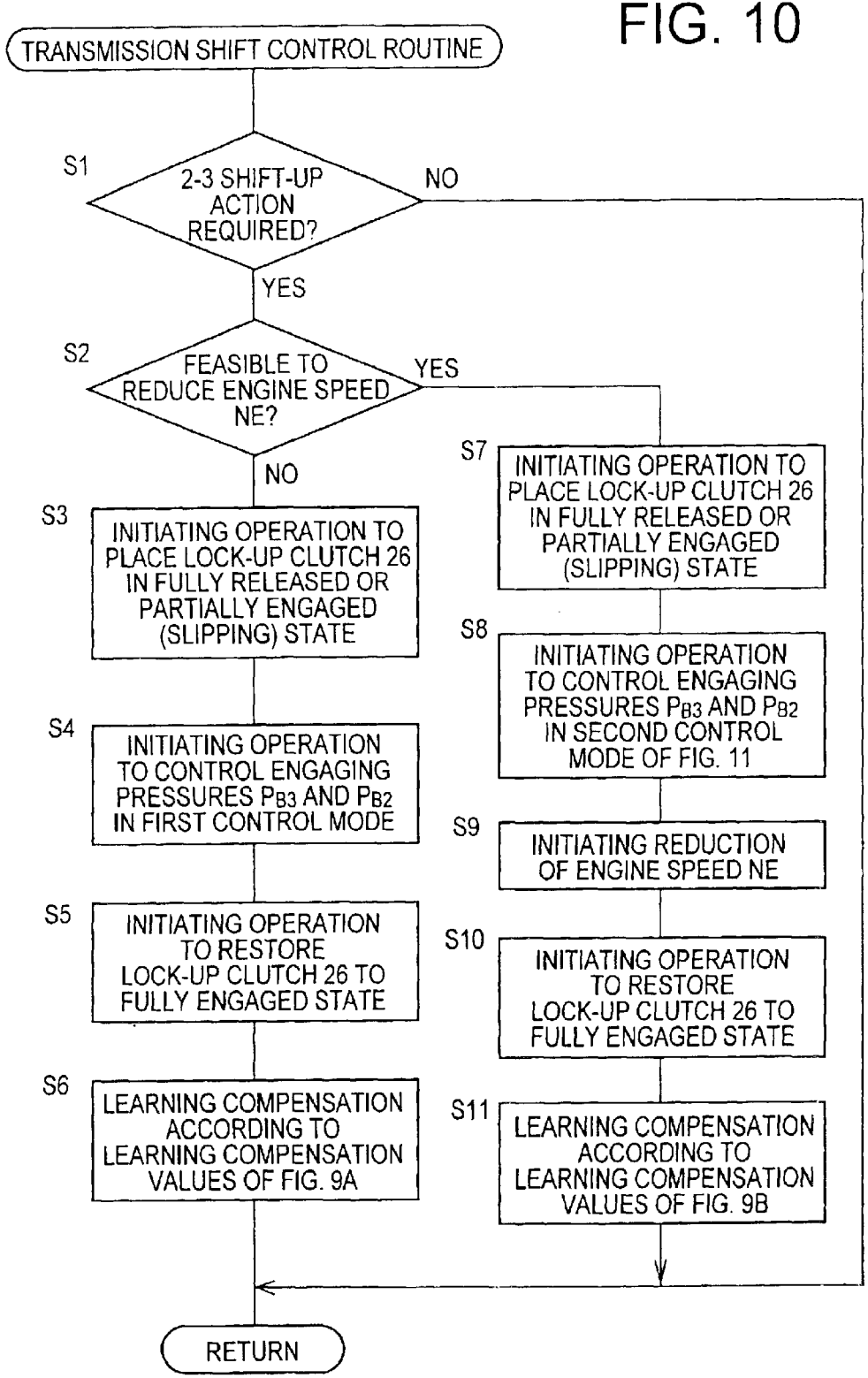
FIG. 10 is a flow chart illustrating a part of a transmission shift control routine executed by the electronic control unit of FIG. 6.

Referring next to the flow chart of FIG. 10, there will be described a part of the transmission shift control routine executed by the electronic control unit 90, in which the 2–3 shift-up action of the automatic transmission 16 is effected in different manners depending upon whether it is feasible to reduce the engine speed NE by controlling only variable drive mechanism 78. The control routine of FIG. 10 is initiated with step S1 corresponding to the shift-up action determining means 100, to make a determination as to whether the 2–3 shift-up action of the automatic transmission 16 is required, on the basis of the detected vehicle running condition and according to the predetermined 2–3 shift-up boundary line. If a negative decision (NO) is obtained in step S1, one cycle of execution of the present control routine is terminated. If an affirmative decision (YES) is obtained in step S1, the control flow goes to step S2 corresponding to the engine-speed-control feasibility determining means 102, to determine whether it is feasible to reduce the engine speed NE by the engine speed control means 108. The determination in step S2 is made at a point of time t1 in the time chart of FIG. 11. If a negative decision (NO) is obtained in step S2, the control flow goes to steps S3–S6 to control the engaging force of the lock-up clutch 26, to control the engaging pressures $P_{B3}$, $P_{B2}$ of the brakes B3, B2 in the first control mode, and effect the learning compensation of the drive signals for the linear solenoid valves SLN, SLU. Described in detail, step S3 corresponding to the lock-up clutch control means 106 is implemented to initiate an operation to place the lock-up clutch 26 in the fully released state (or in the partially engaged or slipping state). Step S4 corresponding to the hydraulic pressure control means 104 is then implemented to initiate an operation to reduce the engaging pressure $P_{B3}$ of the brake B3 and increase the engaging pressure $P_{B2}$ of the brake B2 such that there exists a slipping period during which a drive torque is transmitted through both of the brake B3 in the process of its releasing action and the brake B2 in the process of its engaging action, that is, through the brakes B2 and B2 both placed in the slipping states. Step S5 also corresponding to the lock-up clutch control means 106 is implemented to restore the lock-up clutch 26 to the fully engaged state. Step S6 corresponding to the learning control means 114 is then implemented to effect the learning compensation of the drive signals for the linear solenoid valves SLN and SLU, according to the compensation values B, X selected from the set of values indicated in FIG. 9A.

If an affirmative decision (yes) is obtained in step S2, the control flow goes to steps S7–S11. Namely, step S7 also corresponding to the lock-up clutch control means 106 is implemented to initiate an operation to place the lock-up clutch 26 in the fully released state (or in the partially engaged or slipping state). Step S8 also corresponding to the hydraulic pressure control means 104 is implemented to control the engaging pressures $P_{B3}$, $P_{B2}$ of the brakes B3, B2 in the second control mode, that is, to first reduce the engaging pressure $P_{B3}$ of the brake B3 and then increase the engaging pressure $P_{B2}$ of the brake B2 such that there exists the fully releasing period "A" during which the brakes B3 and B2 are both placed in the fully released states. The fully releasing period "A" exists between a period during which a drive torque is transmitted through the brake B3 in the process of its releasing action and a period during which a drive torque is transmitted through the brake B2 in the process of its engaging action. Step S9 corresponding to corresponding to the engine speed control means 108, running mode detecting means 110 and engine-speed-reduction-rate changing means 112 is implemented to reduce the engine speed NE during the fully releasing period "A", from the value NE2 corresponding to the $2^{nd}$-speed position to the value NE3 corresponding to the $3^{rd}$-speed position, at a rate determined by the presently established vehicle running mode (one of the manual shifting mode, sporty running mode, economical running mode and slippery-road running mode). Step S10 also corresponding to the lock-up clutch control means 106 is implemented to restore the lock-up clutch 26 to its fully engaged state. Step S11 also corresponding to the learning control means 114 is then implemented to effect the learning compensation of the drive signals for the linear solenoid valves SLN and SLU, according to the compensation values b, x selected from the set of values indicated in FIG. 9B.

The time chart of FIG. 11 shows changes of the engine speed NE, engaging pressures $P_{B3}$, $P_{B2}$ and operating states of the lock-up clutch 26 when steps S7–S11 are implemented. Namely, the automatic transmission 16 is commanded to effect the 2–3 shift-up action at the point of time t1, and the lock-up clutch 26 is commanded to be placed in the fully released or slipping state at a point of time t2. The brake B3 is commanded to be fully released at a point of time t3. The reduction of the engine speed NE by the engine speed control means 108 is initiated at a point of time t4 shortly after the brake B3 and lock-up clutch 26 have been brought to their fully released states. The fully releasing period "A" is commenced when the brake B3 has been placed in the fully released state, namely, a short time before the point of time t4 at which the reduction of the engine speed NE is initiated. The engine speed NE is lowered during the fully releasing period "A". The engine speed NE has been lowered to the value NE3 corresponding to the $3^{rd}$-speed position, at a point of time t5 at which the brake B2 is commanded to be fully engaged. After the brake B2 has been placed in the fully engaged state, the lock-up clutch 26 is commanded to be restored to the fully engaged state.

In the integrated vehicle engine/transmission control apparatus constructed according to the illustrated embodiment described above, the reduction of the engine speed NE by the engine speed control means 108 (steps S9) is initiated after the reduction of the engaging force of the lock-up clutch 26 by the lock-up clutch control means 106 (step S7) to reduce a shifting shock of the automatic transmission 16. Accordingly, the generation of the shifting shock is reduced by the torque converter 14 disposed between the engine 10 and the automatic transmission 16.

In the illustrated embodiment, the lock-up clutch control means 106 (steps S7, S10) is arranged to hold the lock-up clutch 26 in its fully released or partially engaged state, for temporarily reducing the engaging force of the lock-up clutch. In this arrangement, the reduction of the engine speed NE by the engine speed control means 108 (step S9) is initiated after the lock-up clutch 26 has been placed in its fully released state or in its partially engaged or slipping state, so that the shifting shock of the automatic transmission 16 can be effectively reduced.

The electronic transmission control unit 90 in the illustrated embodiment is arranged to control the 2–3 shift-up action of the automatic transmission 16, which is effected by an engaging action of a first frictional coupling device in the form of the brake B3 and a releasing action of a second frictional coupling device in the form of the brake B2. The hydraulic pressure control means 104 (step S8) is arranged to control the hydraulic pressures to be applied to the first and second frictional coupling devices to effect the 2–3 shift-up action of the automatic transmission 16, such that reduction of the hydraulic pressure of the first frictional coupling device is initiated after the moment of initiation of reduction of the engaging force of the lock-up clutch 26, and such that an increase of the hydraulic pressure of the second frictional coupling device is initiated such that there exists the fully releasing period "A" during which both of the first and second frictional coupling devices are held in fully released states thereof. The engine speed control means 108 (step S9) is operated to reduce the operating speed of the engine at a predetermined rate during the fully releasing period "A". In this arrangement, the engine speed NE is reduced during the fully releasing period "A" in which the engaging force of the lock-up clutch is held at a reduced value. Accordingly, the present arrangement is effective to reduce the shifting shock of the automatic transmission 16 due to an inertia torque generated by the reduction of the engine speed NE.

In the illustrated embodiment, the engine-speed-control feasibility determining means 102 (step S2) is arranged to determine whether the automotive vehicle is placed in a state that permits the engine 10 to reduce its operating speed NE by itself; and the hydraulic pressure control means 104 (steps S4 and S8) is arranged to control the hydraulic pressures $P_{B3}$, $P_{B2}$ to be applied to selected ones (B3, B2) of the plurality of hydraulically operated frictional coupling devices which are operated to effect the required 2–3 shift-up action of the automatic transmission 16. Further, the hydraulic pressure control means 104 is operable in one of the first and second different control modes which is selected depending upon whether the engine-speed-control feasibility determining means 102 has determined that the vehicle is placed in the state permitting the engine 10 to reduce its operating speed by itself. Thus, the hydraulic pressures to be applied to the first and second frictional coupling devices can be suitably controlled in the adequate control mode selected depending upon whether it is feasible to reduce the engine speed by itself, namely, by controlling only the variable valve mechanism 78.

In the illustrated embodiment, the hydraulic pressure control means 104 (steps S4, S8) is arranged to be operable in the first control mode when the engine-speed-control feasibility determining means 102 (step S2) has determined that the automotive vehicle is not placed in a state that permits the engine to reduce its speed NE by itself, for reducing the hydraulic pressure $P_{B3}$ to be applied to the first frictional coupling device (B3) for effecting the releasing action thereof, and increasing the hydraulic pressure $P_{B2}$ to be applied to the second frictional coupling device (B2) for effecting the engaging action thereof, to effect the required 2–3 shift-up action, such that there exists a slipping period during which a drive torque is transmitted through both of the first frictional coupling device in the process of its releasing action and the second frictional coupling device in the process of its engaging action. When the engine-speed-control feasibility determining means has determined that the vehicle is placed in the above-indicated state, the hydraulic pressure control means is operated in the second control mode, for first reducing the hydraulic pressure to be applied to the first frictional coupling device and then increasing the hydraulic pressure to be applied to the second frictional coupling device, such that there exists the above-indicated fully releasing period "A" during which both of the first and second frictional coupling devices are held in fully released states thereof. Accordingly, the hydraulic pressures to be applied to the first and second frictional coupling devices for effecting the respective releasing and engaging actions to effect the required shit-up action can be suitably controlled in the adequate control mode selected depending upon whether it is feasible to reduce the engine speed by itself, namely, by controlling only the variable valve mechanism 78.

The illustrated embodiment is further adapted such that the engine speed control means 108 controls the variable valve mechanism 78 of the engine 10, so as to reduce the engine speed NE during said fully releasing period "A", so that the engine speed NE is positively reduced to the value NE3 corresponding to the $3^{rd}$-speed position of the automatic transmission 16, whereby the shifting shock due to an inertia torque of the engine 10 is effectively reduced.

In the illustrated embodiment, the engine-speed-reduction-rate changing means 112 is arranged to change a rate of reduction of the operating speed NE of the engine 10 by the engine speed control means 108 during the shifting action of the automatic transmission 16, on the basis of the running mode detected by the running mode detecting means 110. For instance, the engine speed NE during a shift-up operation of the automatic transmission 16 is reduced at the rate suitable for the presently selected running mode of the vehicle, so that the shifting shock of the automatic transmission can be effectively reduced, and the drivability of the vehicle is accordingly improved.

In the illustrated embodiment, the vehicle is operable in a selected one of: the manual shifting mode in which the automatic transmission 16 can be manually shifted; the sporty running mode in which the automatic transmission is automatically shifted so as to improve the accelerating performance or drivability of the automotive vehicle; the economical running mode in which the automatic transmission is automatically shifted so as to improve fuel economy of the engine; and the slippery-road running mode in which the automatic transmission is automatically shifted to a forward drive position having a comparatively low speed ratio, so that an output torque of the automatic transmission is smaller in the slippery-road running mode than in the other running modes, in particular, upon starting or acceleration of the vehicle. In this arrangement, the engine speed NE during a shift-up action of the automatic transmission 16 can be reduced at a rate suitable for the presently selected one of the manual shifting mode, sporty running mode, economical running mode and slippery-road running mode.

In the illustrated embodiment, the learning control means 114 is arranged to effect learning compensation of the engaging pressure of the frictional coupling devices of the automatic transmission 16 during a shifting action (e.g., a shift-up action), in different manners depending upon whether the engine-speed-control feasibility determining means 102 has determined that it is possible to reduce the engine speed NE under the control of the engine speed control means 108, during the shifting action. Namely, the learning control means 114 is arranged to effect the learning compensation of a drive signal for controlling the frictional coupling devices during a shifting action of the automatic transmission, according to one of two sets of the learning compensation values of FIGS. 9A and 9B, which is selected depending upon whether the engine speed NE has been reduced under the control of the engine speed control means 108. That is, the learning compensation value used by the learning control means 114 is determined on the basis of a state in which the engine speed NE has been reduced under control of the engine speed control means 108. Thus, the engaging pressures of the frictional coupling devices are adjusted according to the learning compensation value corresponding to the engine operating state, so that the automatic transmission can be shifted with a reduced shifting shock.

While one embodiment of this invention has been described above, the present invention may be otherwise embodied.

In the illustrated embodiment, the learning control means 114 (steps S6 and S11) is adapted to effect learning compensation of the engaging pressures of the hydraulically operated frictional coupling devices operated to effect shifting actions of the automatic transmission 16. However, the hydraulic pressure of the lock-up clutch 26 in the fully engaged state or slipping state may be controlled by learning compensation.

In the illustrated embodiment, the engine 10 whose speed NE is controllable by means of the variable valve mechanism 78 is also variable in the number of the operating cylinders and is operable in a selected one of the 2-cycle and 4-cycle operating modes. However, the engine 10 need not be variable in the number of the operating cylinders and/or need not be operable in a selected one of the operating modes.

While the lock-up clutch 26 is disposed in the torque converter 14, the lock-up clutch 26 may be disposed in a fluid coupling.

Although the automatic transmission 16 has the five forward drive positions, the vehicle drive system may use an automatic transmission having four forward drive positions, or six or more forward drive positions. While the application of the present invention to the 2–3 shift-up action of the automatic transmission 16 has been described above by reference to FIGS. 10 and 11 by way of example, the principle of the present invention is equally applicable to any other clutch-to-clutch shift-up actions of the transmission, which are achieved by releasing and engaging actions of respective two frictional coupling devices.

Although the first motor/generator MG1 and turbocharger 54 of exhaust turbine type are provided in the drive system of the vehicle in the illustrated embodiment, the principle of the present invention is applicable to a vehicle drive system which does not include the first motor/generator MG1 and turbocharger 54.

It is to be understood that the present invention may be embodied with various other changes, modifications and improvements, which may occur to those skilled in the art, without departing from the spirit and scope of the invention defined in the following claims:

What is claimed is:

1. An integrated vehicle engine/transmission control apparatus for an automotive vehicle having an engine capable of changing an operating speed thereof by itself, and an automatic transmission operatively connected to said engine and including a lock-up clutch, said apparatus comprising:

lock-up clutch control means for controlling an engaging force of said lock-up clutch, during a shifting action of said automatic transmission, to reduce a shifting shock of said automatic transmission; and engine speed control means for controlling said engine so as to reduce its operating speed, during said shifting action of said automatic transmission, such that reduction of said operating speed is initiated after a moment of initiation of reduction of said engaging force of said lock-up clutch by said lock-up clutch control means.

2. An integrated vehicle engine/transmission control apparatus according to claim 1, wherein said lock-up clutch control means is operable to hold said lock-up clutch in a fully released or partially engaged state thereof for a predetermined time, for thereby temporarily reducing said engaging force of said lock-up clutch.

3. An integrated vehicle engine/transmission control apparatus according to claim 1, wherein said automatic transmission includes a first and a second hydraulically operated frictional coupling device, and said shifting action of said automatic transmission is effected by a releasing action of said first frictional coupling device and an engaging action of said second frictional coupling device, said apparatus further comprising hydraulic pressure control means for controlling hydraulic pressures to be applied to said first and second frictional coupling devices to effect said shifting action of said automatic transmission, such that reduction of the hydraulic pressure of said first frictional coupling device is initiated after said moment of initiation of reduction of said engaging force of said lock-up clutch, and such that an increase of the hydraulic pressure of said second frictional coupling device is initiated such that there exists a fully releasing period during which both of said first and second frictional coupling devices are held in fully released states thereof, and wherein said engine speed control means is operable to reduce the operating speed of said engine at a predetermined rate during said fully releasing period.

4. An integrated vehicle/transmission control apparatus according to claim 1, wherein a fluid coupling is connected in parallel with said lock-up clutch.

5. An integrated vehicle/transmission control apparatus according to claim 1, wherein said engine has an intake valve and an exhaust valve which are driven by respective electromagnetic actuators.

6. An integrated vehicle engine/transmission control apparatus according to claim 1, wherein said automatic transmission is a planetary gear type transmission.

7. An integrated vehicle engine/transmission control apparatus for an automotive vehicle having an engine capable of changing an operating speed thereof by itself, and an automatic transmission operatively connected to said engine including a plurality of hydraulically operated frictional coupling devices, said apparatus comprising:

engine-speed-control feasibility determining means for determining whether said automotive vehicle is placed in a state that permits said engine to reduce its operating speed by itself; and hydraulic pressure control means for controlling hydraulic pressures to be applied to selected ones of said plurality of hydraulically operated frictional coupling devices which are operated to effect a required shifting action of said automatic transmission, and wherein said hydraulic pressure control means is operable in one of different control modes which is selected depending upon whether said engine-speed-control feasibility determining means has determined that said vehicle is placed in said state.

8. An integrated vehicle engine/transmission control apparatus according to claim 7, wherein said automatic transmission includes a lock-up clutch.

9. An integrated vehicle/transmission control apparatus according to claim 8, wherein a fluid coupling is connected in parallel with said lock-up clutch.

10. An integrated vehicle/transmission control apparatus according to claim 7, wherein said engine has an intake valve and an exhaust valve which are driven by respective electromagnetic actuators.

11. An integrated vehicle engine/transmission control apparatus according to claim 7, wherein said automatic transmission is a planetary gear type transmission.

12. An integrated vehicle engine/transmission control apparatus for an automotive vehicle having an engine capable of changing an operating speed thereof by itself, and an automatic transmission operatively connected to said engine and including a plurality of hydraulically operated frictional coupling devices which include a first and a second frictional coupling device which are respectively released and engaged to effect a required shifting action of said automatic transmission, said apparatus comprising:

engine-speed-control feasibility determining means for determining whether said automotive vehicle is placed in a state that permits said engine to reduce its operating speed by itself; and hydraulic pressure control means operable in a first control mode when said engine-speed-control feasibility determining means has determined that the automotive vehicle is not placed in said state, for reducing a hydraulic pressure to be applied to said first frictional coupling device for effecting the releasing action thereof, and increasing a hydraulic pressure to be applied to said second frictional coupling device for effecting the engaging action thereof, to effect said required shifting action, such that there exists a slipping period during which a drive torque is transmitted through both of said first frictional coupling device in the process of its releasing action and said second frictional coupling device in the process of its engaging action, said hydraulic pressure control means being operable in a second control mode when said engine-speed-control feasibility determining means has determined that the automotive vehicle is placed in said state, for first reducing the hydraulic pressure to be applied to said first frictional coupling device and then increasing the hydraulic pressure to be applied to said second frictional coupling device, such that there exists a fully releasing period during which both of said first and second frictional coupling devices are held in fully released states thereof.

13. An integrated vehicle engine/transmission control apparatus according to claim 12, wherein said automatic transmission includes a lock-up clutch.

14. An integrated vehicle engine/transmission control apparatus according to claim 12, further comprising engine speed control means for controlling said engine so as to reduce its operating speed during said fully releasing period.

15. An integrated vehicle/transmission control apparatus according to claim 13, wherein a fluid coupling is connected in parallel with said lock-up clutch.

16. An integrated vehicle/transmission control apparatus according to claim 12, wherein said engine has an intake valve and an exhaust valve which are driven by respective electromagnetic actuators.

17. An integrated vehicle engine/transmission control apparatus according to claim 12, wherein said automatic transmission is a planetary gear type transmission.

18. An integrated vehicle engine/transmission control apparatus for an automotive vehicle having an engine capable of changing an operating speed thereof by itself, and an automatic transmission operatively connected to said engine, said apparatus comprising:

engine speed control means for controlling said engine so as to reduce its operating speed by itself, during a shifting action of said automatic transmission;

running mode detecting means for detecting a running mode of the automotive vehicle; and engine-speed-reduction-rate changing means for changing a rate of reduction of the operating speed of said engine by said engine speed control means, on the basis of the running mode detected by said running mode detecting means.

19. An integrated vehicle engine/transmission control apparatus according to claim 18, wherein the automotive vehicle is operable in a selected one of:

a manual shifting mode in which said automatic transmission can be manually shifted;

a sporty running mode in which the automatic transmission is automatically shifted so as to improve an accelerating performance of the automotive vehicle;

an economical running mode in which the automatic transmission is automatically shifted so as to improve fuel economy of said engine; and a slippery-road running mode in which the automatic transmission is automatically shifted such that an output torque of the automatic transmission is smaller in said slippery-road running mode than in the other running modes.

20. An integrated vehicle/transmission control apparatus according to claim 18, wherein said automatic transmission includes a lock-up clutch which is connected in parallel with a fluid coupling.

21. An integrated vehicle/transmission control apparatus according to claim 18, wherein said engine has an intake valve and an exhaust valve which are driven by respective electromagnetic actuators.

22. An integrated vehicle engine/transmission control apparatus according to claim 18, wherein said automatic transmission is a planetary gear type transmission.

23. An integrated vehicle engine/transmission control apparatus according to claim 19, wherein said engine-speed-reduction-rate changing means changes the rate of reduction of the operating speed of said engine by said engine speed control means such that said rate of reduction is higher in said sporty running mode than in said manual shifting mode, said economical running mode and said slippery-road running mode.

24. An integrated vehicle engine/transmission control apparatus for an automotive vehicle having an engine capable of changing an operating speed thereof by itself, and an automatic transmission operatively connected to said engine, said apparatus comprising:

engine speed control means for controlling said engine so as to reduce its operating speed by itself, during a shifting action of said automatic transmission; and learning control means for changing a learning compensation value of said automatic transmission, on the basis of a result of control of the operating speed of said engine by said engine speed control means.

25. An integrated vehicle engine-transmission control apparatus according to claim 24, further comprising engine-speed-control feasibility determining means for determining whether said automotive vehicle is placed in a state that permits said engine to reduce its operating speed by itself; and wherein said learning control means effects the learning compensation of said automatic transmission, according to one of two different sets of learning compensation values which is selected depending upon whether said engine-speed-control feasibility determining means has determined that the automotive vehicle is placed in said state.

26. An integrated vehicle engine/transmission control apparatus according to claim 24, wherein said learning control means changes said learning compensation value on the basis of a state in which the operating speed of said engine has been reduced under the control of said engine speed control means.

27. An integrated vehicle engine/transmission control apparatus according to claim 24, wherein said automatic transmission includes two hydraulically operated frictional coupling devices which are engaged and released, respectively, to effect said shifting action, and said learning control means changes learning compensation values for controlling hydraulic pressures to be applied to said two frictional coupling devices to effect said shifting action of said automatic transmission.

28. An integrated vehicle/transmission control apparatus according to claim 24, wherein said automatic transmission includes a lock-up clutch which is connected in parallel with a fluid coupling.

29. An integrated vehicle/transmission control apparatus according to claim 24, wherein said engine has an intake valve and an exhaust valve which are driven by respective electromagnetic actuators.

30. An integrated vehicle engine/transmission control apparatus according to claim 24, wherein said automatic transmission is a planetary gear type transmission.

\* \* \* \* \*